(12) United States Patent
Hoge et al.

(10) Patent No.: US 11,805,751 B1
(45) Date of Patent: Nov. 7, 2023

(54) INFLATABLE ANIMAL CRATE

(71) Applicant: Diggs Inc., Long Island City, NY (US)

(72) Inventors: Gregory Hoge, Ridgewood, NY (US); Isaac Haverlick, Jersey City, NJ (US); Zel Alexander Crampton, Brooklyn, NY (US); Courtney Armstrong, Astoria, NY (US); Lilly Althauser-Benson, Tampa Bay, FL (US); Carlee Green-Goff, New York, NY (US); Adriana Morante, Astoria, NY (US); Cody Moore, Brooklyn, NY (US); Mark Prommel, Montclair, NJ (US); Brooke Williams, New York, NY (US)

(73) Assignee: Diggs Inc., Long Island City, NY (US)

(*) Notice: Subject to any disclaimer, the term of this patent is extended or adjusted under 35 U.S.C. 154(b) by 0 days.

(21) Appl. No.: 18/117,250

(22) Filed: Mar. 3, 2023

(51) Int. Cl.
*A01K 1/02* (2006.01)

(52) U.S. Cl.
CPC .................................. *A01K 1/0272* (2013.01)

(58) Field of Classification Search
CPC .. A01K 1/0245; A01K 1/0272; A01K 1/0236; A01K 1/0035; A01K 1/033; A01K 1/034
See application file for complete search history.

(56) References Cited

U.S. PATENT DOCUMENTS

| 5,615,640 A | * | 4/1997 | Luiz ........................ | A01K 1/034 |
| | | | | 119/482 |
| 6,354,245 B1 | * | 3/2002 | Roddy ................. | A01K 1/0272 |
| | | | | 119/482 |
| 11,117,524 B2 | | 9/2021 | Prade et al. | |

(Continued)

FOREIGN PATENT DOCUMENTS

| DE | 19501875 A1 | * | 7/1996 | .............. B60P 7/135 |
| GB | 2449148 A | * | 11/2008 | ........... A01K 1/0272 |

(Continued)

OTHER PUBLICATIONS

"Air-Chalet", Flated, Available online at https://getflated.com/products/air-chalet?variant=40058574176424, 2 pages.

(Continued)

*Primary Examiner* — Monica L Perry
*Assistant Examiner* — Aaron M Rodziwicz
(74) *Attorney, Agent, or Firm* — Kilpatrick Townsend & Stockton LLP

(57) ABSTRACT

An inflatable crate assembly includes a base panel, a rear panel, a first side panel, a second side panel, and a top panel, where: the base panel, the rear panel, the first side panel, the second side panel, and the top panel are all formed from a single piece of drop stitch material; an inner wall of the drop stitch material forms at least a portion of an interior surface of the inflatable crate assembly; and an outer wall of the drop stitch material forms at least a portion of an exterior surface of the inflatable crate assembly; and the inflatable crate also includes a drop stitch corner formed between each of the rear panel and the base panel, the first side panel and the base panel, the top panel and the first side panel, and the second side panel and the top panel.

20 Claims, 8 Drawing Sheets

(56) References Cited

U.S. PATENT DOCUMENTS

| | | | |
|---|---|---|---|
| 2006/0260558 A1* | 11/2006 | Wu | A01K 1/033 |
| | | | 119/498 |
| 2009/0126638 A1* | 5/2009 | Bennett | A01K 1/0272 |
| | | | 119/28.5 |
| 2011/0132274 A1* | 6/2011 | Cagle | A01K 1/034 |
| | | | 119/501 |
| 2017/0119116 A1 | 5/2017 | Bradley | |
| 2019/0335703 A1* | 11/2019 | Prade | B60R 7/00 |
| 2020/0307118 A1* | 10/2020 | Hjerpe | B29C 66/1122 |
| 2020/0307154 A1 | 10/2020 | Hjerpe et al. | |
| 2020/0397145 A1 | 12/2020 | Hjerpe et al. | |
| 2020/0399091 A1 | 12/2020 | Hjerpe et al. | |
| 2021/0354785 A1 | 11/2021 | Prade | |
| 2022/0090407 A1* | 3/2022 | Watts | E04H 15/06 |

FOREIGN PATENT DOCUMENTS

| | | | | |
|---|---|---|---|---|
| WO | 2018170337 A2 | 9/2018 | | |
| WO | WO-2020128692 A1 * | 6/2020 | | A01K 1/0035 |
| WO | WO-2021016424 A1 * | 1/2021 | | E04H 4/0025 |
| WO | WO-2021059312 A1 * | 4/2021 | | |

OTHER PUBLICATIONS

"Dometic Hub", Inflatable Activity Shelter, Available online at https://www.dometic.com/en-se/outdoor/car-camping/shelters/dometic-hub-268870, 4 pages.
"Inflatable Dog Box—Comfort and Security Through Impack Protection", Tami, 11 pages.
PCT/US2023/014522, "International Search Report and Written Opinion", dated Sep. 4, 2023, 17 pages.

\* cited by examiner

INFLATABLE ANIMAL CRATE

TECHNICAL FIELD

The present disclosure relates to the pet industry generally and more specifically to inflatable animal crates.

BACKGROUND

Animal enclosures or crates for pets are often large and bulky and made from heavy materials including wood, metal, plastics, etc. The size and weight of such crates make them take up large amounts of space when storing them and difficult to move and install for use in vehicles. Existing inflatable animal crates lack the structure needed to provide adequate safety and protection for animal(s) contained within the inflatable animal crate in the event the vehicle crashes.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, an inflatable crate assembly includes: a base panel, a rear panel, a first side panel, a second side panel, and a top panel, where: the base panel, the rear panel, the first side panel, the second side panel, and the top panel are all formed from a single piece of drop stitch material; an inner wall of the drop stitch material forms at least a portion of an interior surface of the inflatable crate assembly; and an outer wall of the drop stitch material forms at least a portion of an exterior surface of the inflatable crate assembly; and the inflatable crate assembly also includes a drop stitch corner formed between each of the rear panel and the base panel, the first side panel and the base panel, the top panel and the first side panel, and the second side panel and the top panel.

According to certain embodiments of the present disclosure, an inflatable crate assembly includes: a base panel, a rear panel, a first side panel, a second side panel, and a top panel, where: the base panel, the rear panel, the first side panel, the second side panel, and the top panel are all formed from a single piece of drop stitch material; an inner wall of the drop stitch material forms at least a portion of an interior surface of the inflatable crate assembly; and an outer wall of the drop stitch material forms at least a portion of an exterior surface of the inflatable crate assembly; the inflatable crate assembly also includes a drop stitch corner formed between at least one of the rear panel and the base panel, the first side panel and the base panel, the top panel and the first side panel, the second side panel and the top panel, or the base panel and the second side panel, where a first connecting member is coupled to the inner wall of the respective panels on each side of the connected corner, and a second connecting member is coupled to the outer wall of the respective panels on each side of the connected corner.

According to certain embodiments of the present disclosure, a method for deploying and stowing an inflatable crate assembly that includes a base panel, a rear panel, a first side panel, a second side panel, a top panel, and a front panel and an air intake valve, where at least the base panel, the rear panel, the first side panel, the second side panel, and the top panel are all formed from a single piece of drop stitch material, the method including: inflating each of the base panel, the rear panel, the first side panel, the second side panel, and the top panel via the air intake valve; fastening the rear panel to a rear end of each of the first side pane, the top panel, and the second side panel to lock the rear panel between the base panel, the first side panel, the second side panel, and the top panel; and fastening the front panel to a front end of each of the first side pane, the top panel, and the second side panel.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

As used herein, directional and spatial terms such as "right," "left," "top," "bottom," "front," "rear," "horizontal," "vertical," "horizontally," "vertically," and "upward" are not intended to be binding terms.

Certain aspects and features of the present disclosure relate to inflatable animal crates. The embodiments of the present disclosure described below are not intended to be exhaustive or to limit the disclosure to the precise forms described herein. Rather, the embodiments described herein are chosen so that a person of skill in the art can appreciate and understand the principles and practices of the present disclosure.

Figure 1A:
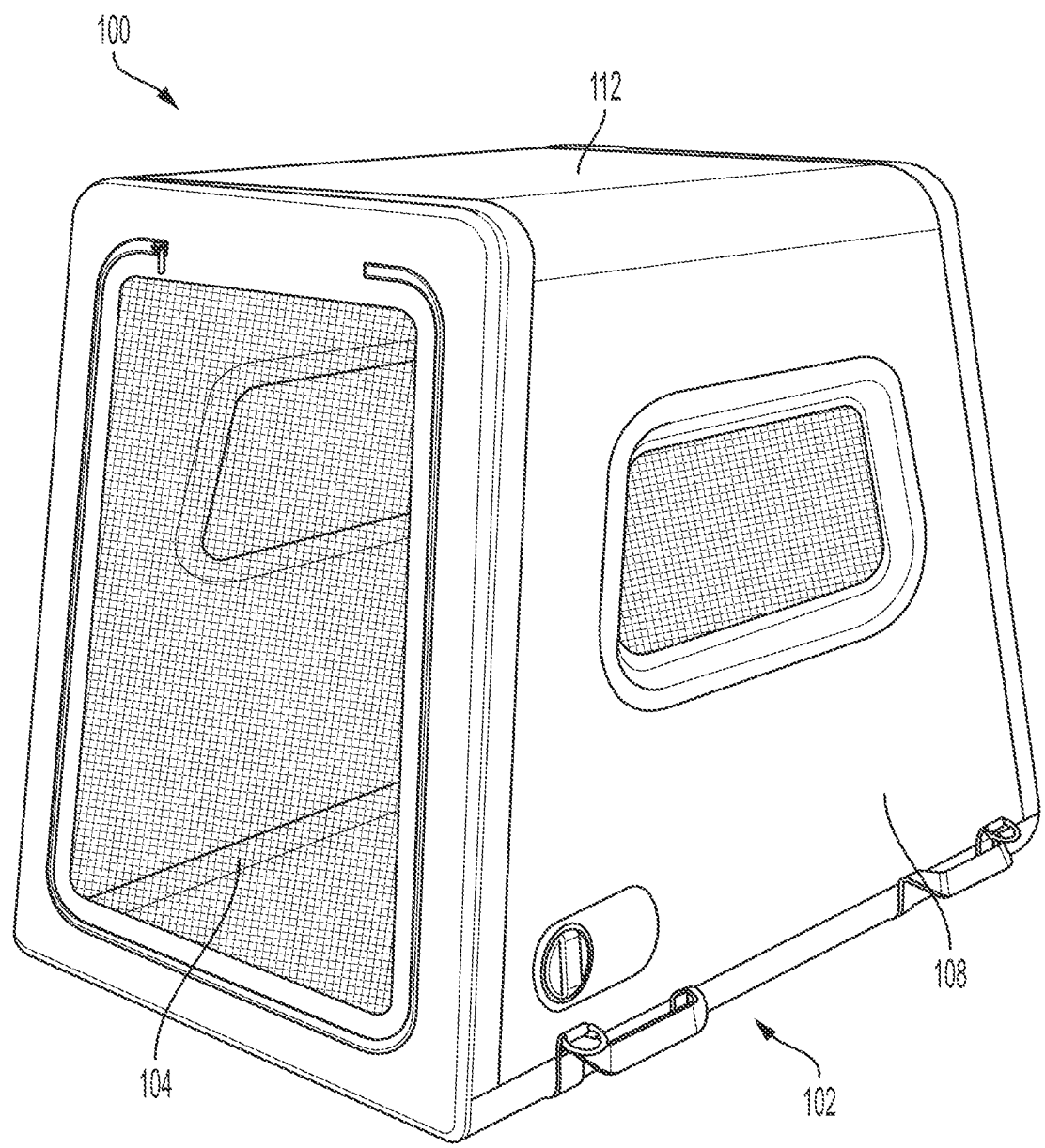
FIG. 1A is a front perspective view of an inflatable animal crate according to certain aspects of the present disclosure.
Figure 1B:
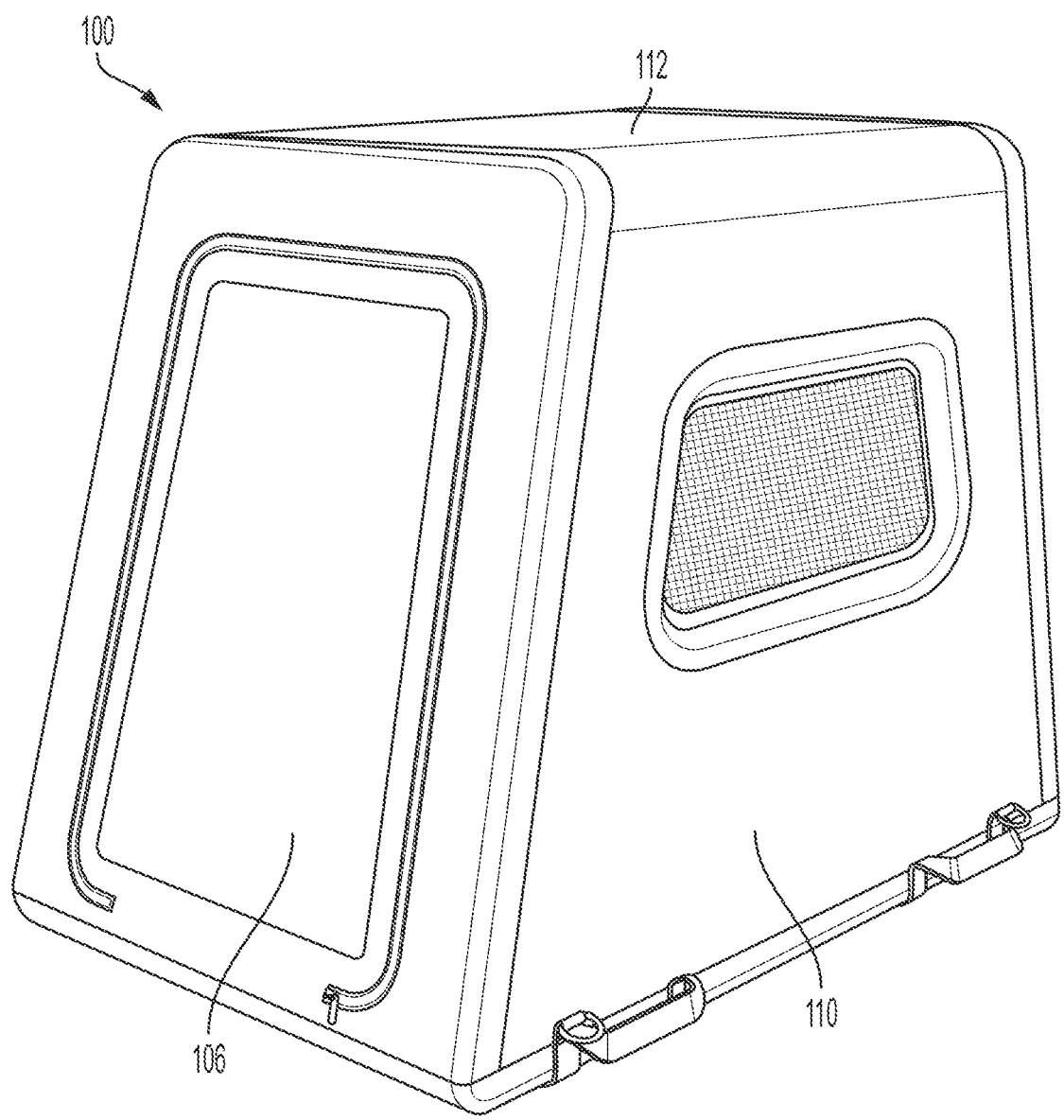
FIG. 1B is a rear perspective view of the inflatable animal crate of FIG. 1A.

Described are various embodiments of an inflatable animal crate 100 as shown in FIGS. 1A-1B. The inflatable animal crate 100 is designed to enable pet owners to safely and securely contain animals within a vehicle, e.g., in a trunk space, on a seat, in a truck bed, in a cargo space, etc., to enhance the overall safety and comfort for the animal and human passengers when traveling. In some embodiments, the inflatable animal crate 100 is formed from wall panels, where at least a portion of at least one wall panel is formed from an inflatable drop stitch material. In further embodiments, at least a portion of at least one wall panel may be formed from any suitable inflatable material.

The inflatable drop stitch material may be a fabric, e.g., a PVC-coated and/or laminated nylon and/or polyester fabric, with layers joined by a dense array of connecting material, e.g., vertical linear and/or zigzag fibers and/or polyester strands that are uniform in size. Therefore, the inflatable drop stitch material has an outer wall, an inner wall, and connecting material between the outer wall and the inner wall. When the inflatable drop stitch material then is adapted, e.g., glued and/or welded, into a desired shape, and subsequently pressurized with air, it may be transformed into a strong, firm structure. The vertical fibers and/or strands, which may be referred to as the drop stitches, hold the air chamber firmly in shape, thus allowing the inflated structure to maintain its shape and stability under heavy outside pressure and impact.

In some embodiments, the inflatable drop stitch material may be formed as described in U.S. Patent Application Publication No. 2020/0307118, entitled "Foldable inflatable structure," in U.S. Patent Application Publication No. 2020/0307154, entitled "Manufacturing of an Inflatable Structure," U.S. Patent Application Publication No. 2020/0399091, entitled "Drop Stitch Tethers Alignment," and/or U.S. Patent Application Publication No. 2020/0397145, entitled "Inflatable Structure," each of which is incorporated herein by reference in its entirety.

The inflatable animal crate 100 may include at least one of a base panel 102, a front panel 104, a rear panel 106, a first side panel 108, a second side panel 110, and a top panel 112. In some embodiments, the inflatable animal crate 100 includes each of the base panel 102, the front panel 104, the rear panel 106, the first side panel 108, the second side panel 110, and the top panel 112. At least a portion of at least one of the base panel 102, the front panel 104, the rear panel 106, the first side panel 108, the second side panel 110, or the top panel 112 is formed from an inflatable drop stitch material. At least a portion of the inner wall of the inflatable drop stitch material of at least one of the panels may form an interior surface of the inflatable animal crate 100. At least a portion of the outer wall of the inflatable drop stitch material of at least one of the panels may form an exterior surface of the inflatable animal crate 100.

Figure 2:
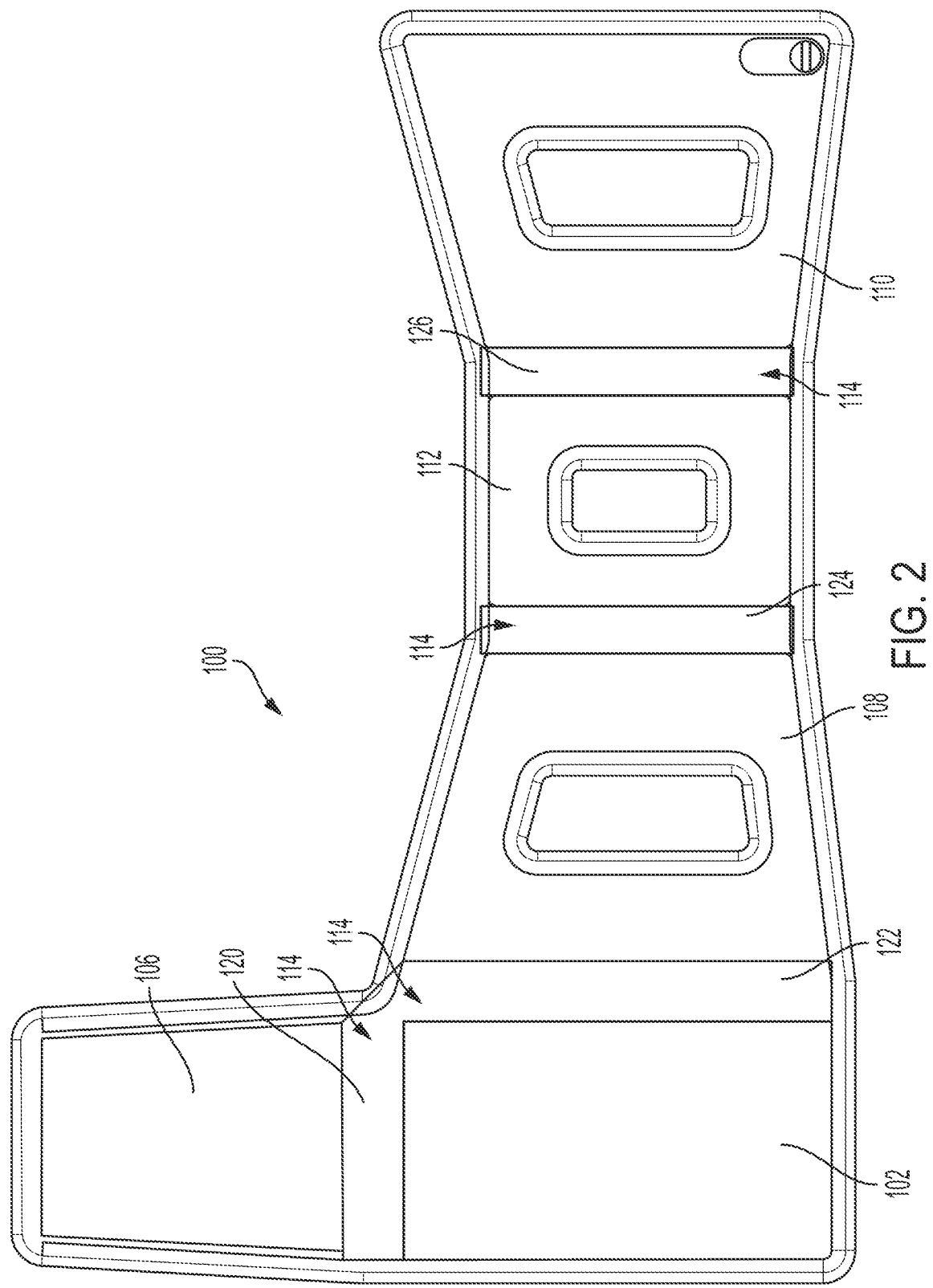
FIG. 2 is a top plan view of a flat-lying inflatable drop stitch material used to form an inflatable animal crate according to certain aspects of the present disclosure.

In certain embodiments, the base panel 102, the rear panel 106, the first side panel 108, the second side panel 110, and the top panel 112 are all formed from a single piece of drop stitch material. Folds are formed in the single piece of drop stitch material, e.g., as seen in FIG. 2 showing the flat-lying, inflatable drop stitch material, to create drop stitch corners 114 between the connected panels. A corner may be formed at an intersection where two or more panels meet. For example, a drop stitch corner 114 is formed between the base panel 102 and the rear panel 106, between the base panel 102 and the first side panel 108, between the first side panel 108 and the top panel 112, and between the top panel 112 and the second side panel 110.

In some embodiments, the front panel 104 may also be formed from the same single piece of drop stitch material. A drop stitch corner 114 may be formed either between the base panel 102 and the front panel 104 where the front panel 104 extends from the base panel 102 or between the top panel 112 and the front panel 104 where the front panel 104 extends from the top panel 112. In further embodiments, the front panel 104 may be formed from a material other than drop stitch material, e.g., a flexible mesh or any other suitable material.

Figure 3:
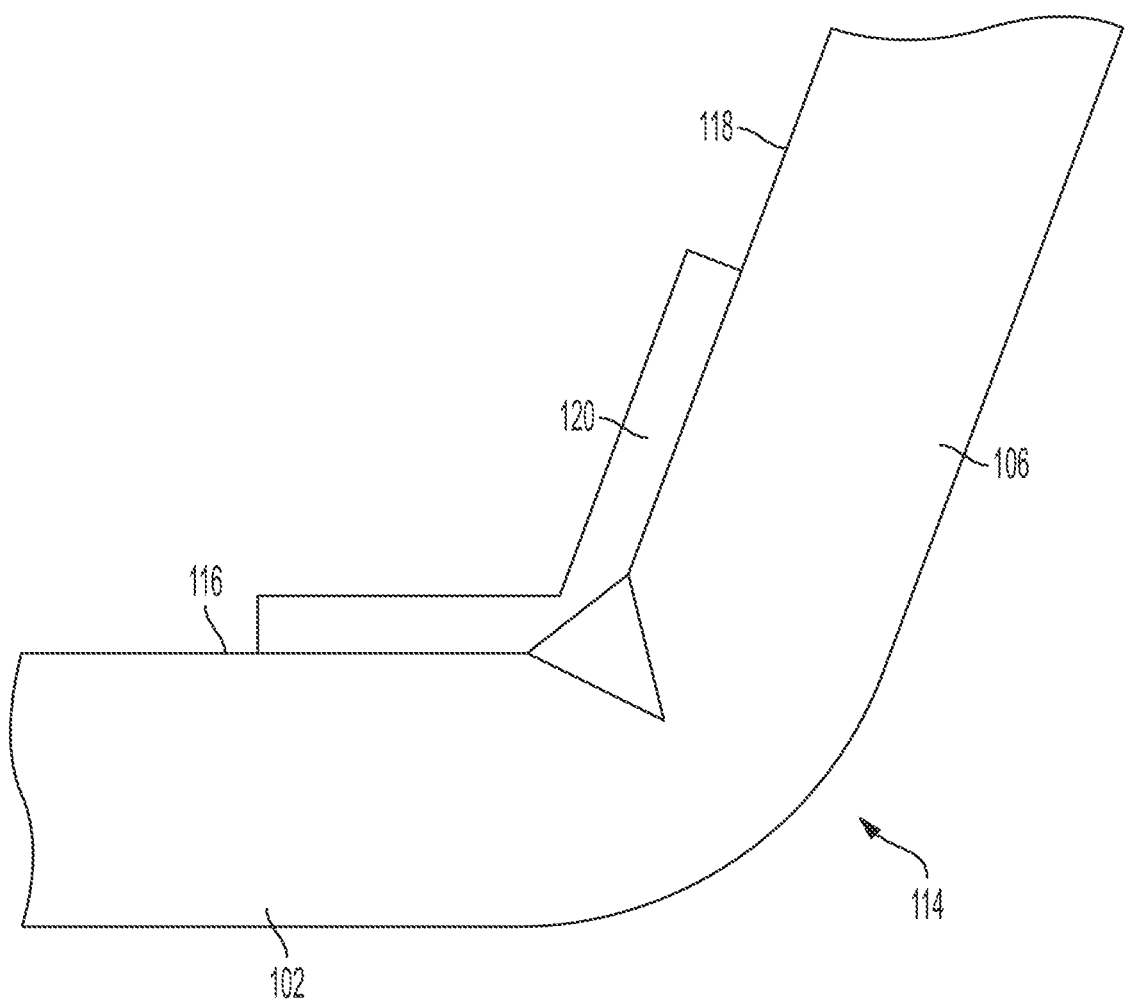
FIG. 3 is a partial cross-sectional view of a drop stitch corner of an inflatable animal crate according to certain aspects of the present disclosure.

The drop stitch corners 114 permit air to travel between the various panels formed from the single piece of drop stitch material as the inflatable animal crate 100 is inflated or deflated. In the folded state, the inner walls of the inflatable drop stitch material of adjacent panels do not come into contact at the drop stitch corners 114. For example, as seen in FIG. 3, the inner wall 116 of the base panel 102 does not contact the inner wall 118 of the rear panel 106 at the drop stitch corner 114 between the base panel 102 and the rear panel 106. Further, the inner wall 116 of the base panel 102 does not contact the inner wall of the first side panel 108 at the drop stitch corner 114 between the base panel 102 and the first side panel 108, the inner wall of the first side panel 108 does not contact the inner wall of the top panel 112 at the drop stitch corner 114 between the first side panel 108 and the top panel 112, and the inner wall of the top panel 112 does not contact the inner wall of the second side panel 110 at the drop stitch corner 114 between the top panel 112 and the second side panel 110.

In some embodiments, a corner member is coupled to the inner walls of adjacent panels to form an inner surface of the drop stitch corners 114. The corner member may stabilize the drop stitch corners 114 as well as provide a smooth, durable inner surface of the drop stitch corners 114 that protect the drop stitch corners 114 from damage by an animal contained in the inflatable animal crate 100. The corner members may be formed from PVC-coated fabric, laminated nylon fabric, polyester fabric, or any other suitable material.

The corner members and the respective inner walls of adjacent panels may be adhered together using an adhesive or may be welded together. For example, a first portion of a first corner member 120 is coupled to the inner wall 116 of the base panel 102 and a second portion of the first corner member 120 is coupled to the inner wall 118 of the rear panel 106 at the drop stitch corner 114. As seen in FIG. 3, the inner wall 116 of the base panel 102 and the inner wall 118 of the rear panel 106 maintain a separation so that the inner wall 116 and the inner wall 118 do not contact each other even with the first corner member 120 coupled to the inner wall 116 and the inner wall 118. This separation is maintained between each inner wall at adjacent panels coupled by corner members.

Each drop stitch corner 114 may have a corner member. For example, a first portion of a second corner member 122 is coupled to the inner wall 116 of the base panel 102 and a second portion of the second corner member 122 is coupled to the inner wall of the first side panel 108 at the respective drop stitch corner 114. In some embodiments, the first corner member 120 and the second corner member 122 are integrally formed. Further, a first portion of a third corner member 124 is coupled to the inner wall of the first side panel 108 and a second portion of the third corner member 124 is coupled to the inner wall of the top panel 112 at the respective drop stitch corner 114. Still further, a first portion of a fourth corner member 126 is coupled to the inner wall of the top panel 112 and a second portion of the fourth corner member 126 is coupled to the inner wall of the second side panel 110 at the respective drop stitch corner 114.

Figure 4A:
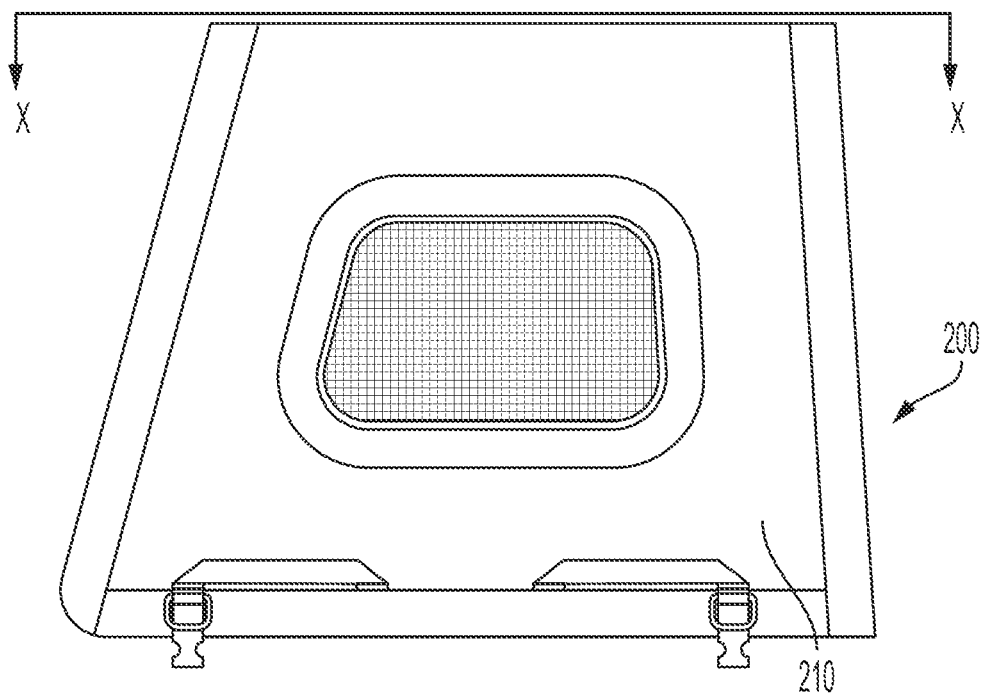
FIG. 4A is a side view of an inflatable animal crate according to certain aspects of the present disclosure.
Figure 4B:
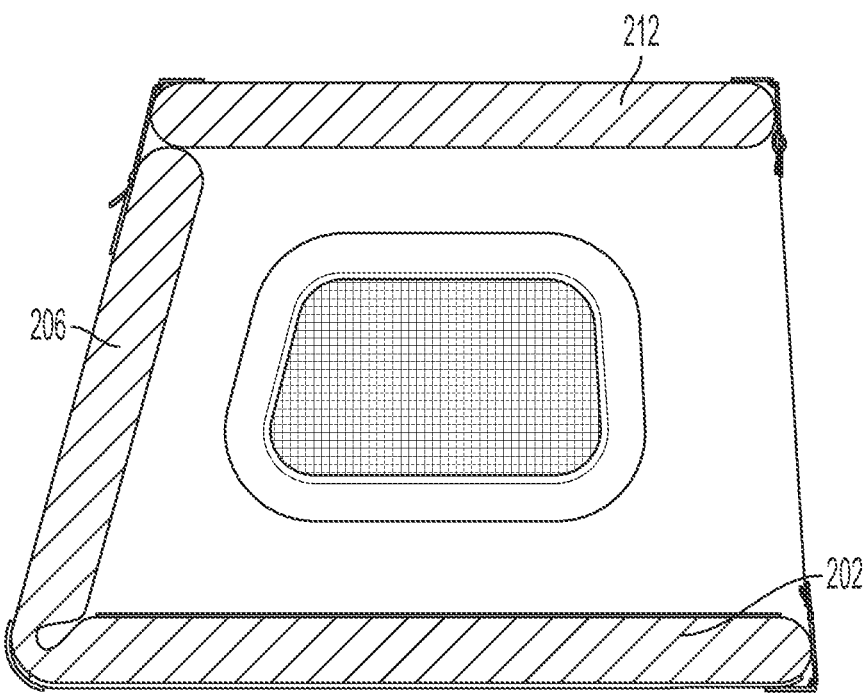
FIG. 4B is a cross-sectional view of the inflatable animal crate of FIG. 4A taken along line X-X.
Figure 5A:
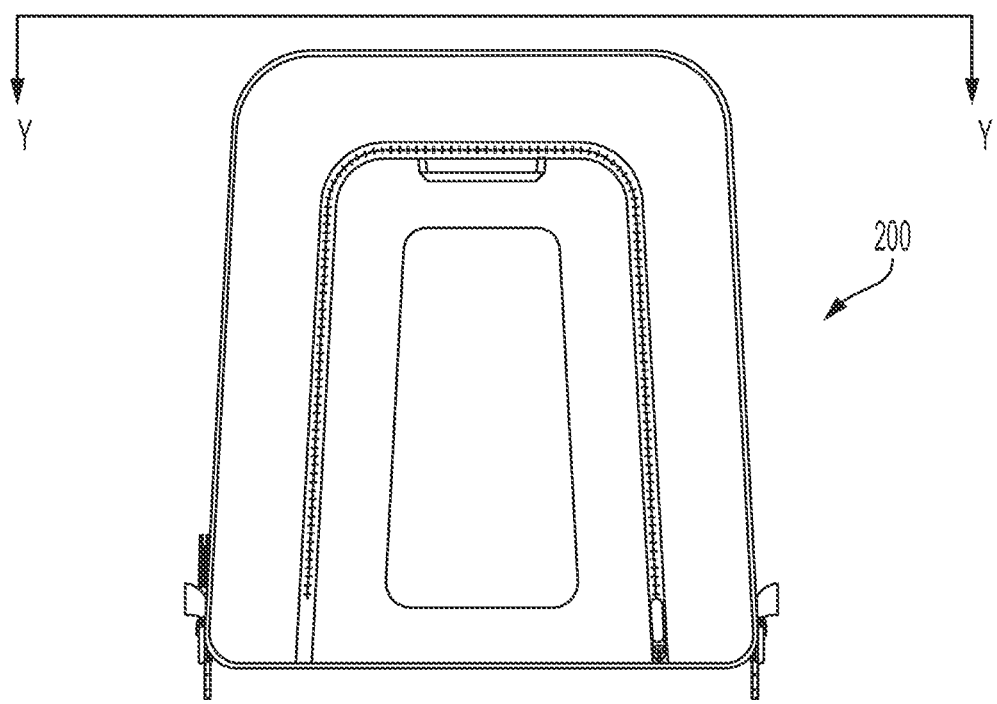
FIG. 5A is a rear view of an inflatable animal crate according to certain aspects of the present disclosure.

FIGS. 4A and 5A show a side view and a rear view, respectively, of an inflatable animal crate 200. The inflatable animal crate 200 may include the same or similar elements as the inflatable animal crate 100 described above with respect to FIGS. 1A-3. FIG. 4B shows a cross-sectional view of the inflatable animal crate 200 of FIG. 4A along line X-X. FIG. B shows a cross-sectional view of the inflatable animal crate 200 of FIG. 5A along line Y-Y.

Figure 5B:
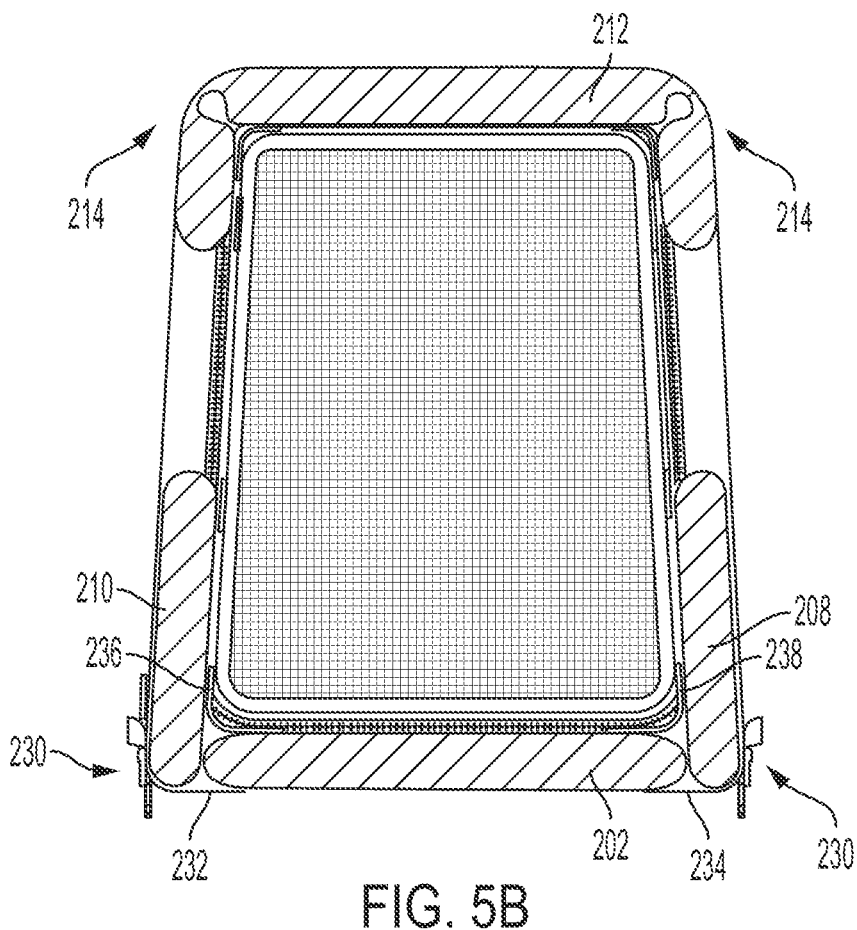
FIG. 5B is a cross-sectional view of the inflatable animal crate of FIG. 5A taken along line Y-Y.

In some embodiments, the inflatable animal crate 200 includes a base panel 202, a rear panel 206, a first side panel 208, a top panel 212 and a second side panel 210. The inflatable animal crate 200 includes at least one drop stitch corner 214, which may be the same or similar to the drop stitch corners 114 described above with respect to FIGS. 1A-3. Additionally, the inflatable animal crate 200 may include at least one connected corner 230. The connected corners 230 are formed between adjacent wall panels that are not connected by the inflatable drop stitch material so air cannot flow between adjacent wall panels at the connected corners 230. For example, as seen in FIG. 5B, the base panel 202 abuts the first side panel 208 and the second side panel 210, but the rear panel 206 is not connected to the first side panel 208 or the second side panel 210 by the inflatable drop stitch material. Therefore, air cannot flow between the base panel 202 and the first side panel 208 or the second side panel 210.

A connecting member may be used to couple the adjacent wall panels to each other at the connected corners 230. As such, the connecting member may form at least a portion of the outer surface of the inflatable animal crate 200. The connecting member may stabilize the connected corners 230 as well as provide a smooth, durable outer surface of the connected corners 230 that protect the connected corners 230 from damage.

In some embodiments, the inflatable animal crate 200 may include a connected corner 230 between the base panel 202 and the first side panel 208 and/or between the base panel 202 and the second side panel 210. For example, a first portion of a first connecting member 232 may be coupled to an outer wall of the rear panel 206 and a second portion of the first connecting member 232 may be coupled to an outer wall of the second side panel 210 at the respective connected corner 230. Further, a first portion of a second connecting member 234 may be coupled to an outer wall of the rear panel 206 and a second portion of the second connecting member 234 may be coupled to an outer wall of the first side panel 208 at the respective connected corner 230.

In certain embodiments, a single connected corner 230 may include more than one connecting member. For example, connected corner 230 may include an exterior connecting member that may form at least a portion of the outer surface of the inflatable animal crate 200 and an interior connecting member that may form at least a portion of the inner surface of the inflatable animal crate 200.

As may be seen in FIG. 5B, the first connecting member 232 may be an exterior connecting member, and connected corner 230 may include a third connecting member 236 forming an interior connecting member. A first portion of the third connecting member 236 may be coupled to an inner wall of the base panel 202 and a second portion of the third connecting member 236 may be coupled to an inner wall of the second side panel 210 at the respective connected corner 230. Further, the second connecting member 234 may be an exterior connecting member, and connected corner 230 may include a fourth connecting member 238 forming an interior connecting member. A first portion of the fourth connecting member 238 may be coupled to an inner wall of the base panel 202 and a second portion of the fourth connecting member 238 may be coupled to an inner wall of the first side panel 208 at the respective connected corner 230.

It may be beneficial to provide interior connecting members at any connected corner 230 that connects to the base panel 202 to provide a smooth, durable inner surface of the connected corners 230 and protect the connected corners 230 from damage by an animal contained in the inflatable animal crate 200. The connected corners 230 that connect to the base panel 202 are likely to experience more wear by the animal than connected corners 230 that connect to the top panel 212.

Referring to FIGS. 1A-2, the wall panels may include any number of additional features including, but not limited to, openings, zipper closures, air valves, carrying handles, D-ring connectors, pockets, etc. For example, at least one of the base panel 102, the front panel 104, the rear panel 106, the first side panel 108, the second side panel 110, or the top panel 112 may include at least one opening extending through the inflatable drop stitch material of the respective panel. In some embodiments, the at least one opening may be at least partially covered by a mesh or other suitable material that permits airflow into and out of the interior of the inflatable animal crate 100 while preventing the ingress and egress of an animal through the at least one opening.

Figure 6:
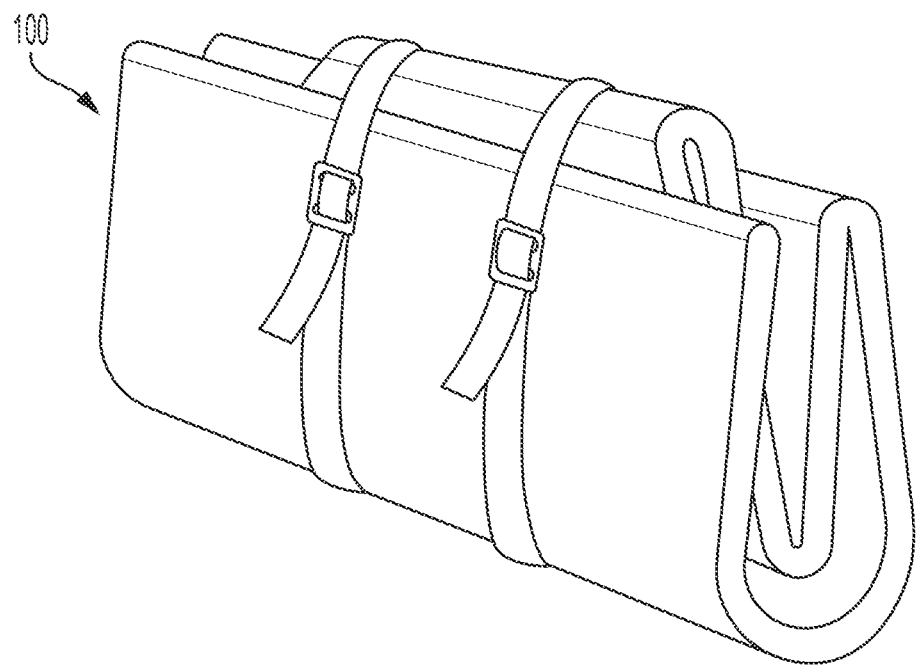
FIG. 6 is a perspective view of an inflatable animal crate in a deflated and folded state according to certain aspects of the present disclosure.
Figure 7:
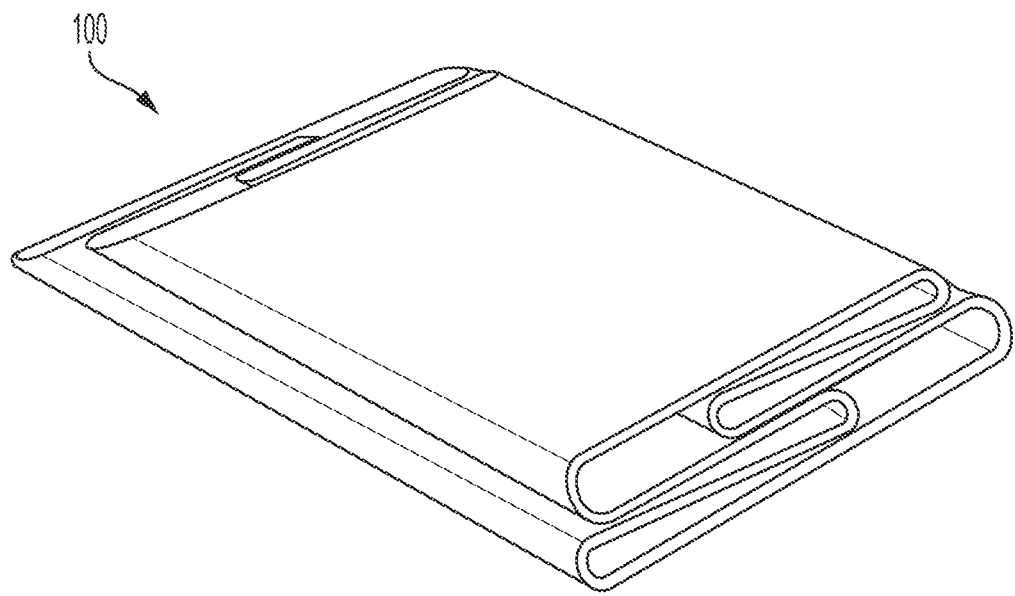
FIG. 7 is a perspective view of an inflatable animal crate in a deflated state according to certain aspects of the present disclosure.

The inflatable animal crate 100, 200 may move between two states, an inflated or deployed state and a deflated or stowed state. In the deflated state, as seen in FIGS. 6 and 7, at least a portion of the air has been expelled from inside the inflatable drop stitch material forming the wall panels. As such, the inflatable animal crate 100, 200 may be folded into a compact shape for easy transportation and storage.

Figure 8:
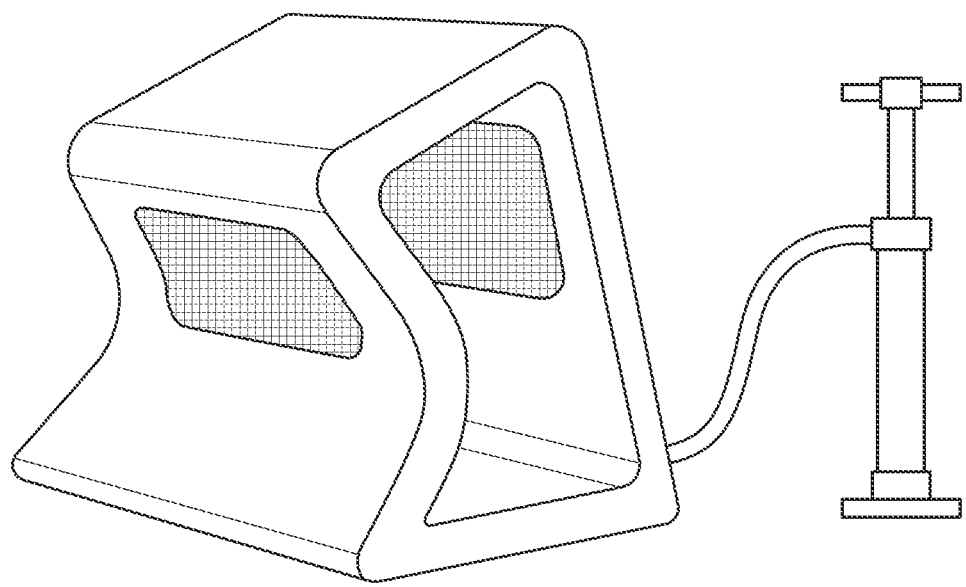
FIG. 8 is a perspective view of an inflatable animal crate moving from a deflated state to an inflated state according to certain aspects of the present disclosure.

To move from the deflated state to the inflated state, as seen in FIG. 8, a user may blow air into the inflatable drop stitch material, e.g., via the air valve using an air pump. The air moves through wall panel to wall panel so that each wall panel formed from the single piece of inflatable drop stitch material, e.g., the base panel 102, the rear panel 106, the first side panel 108, the second side panel 110, and the top panel 112 is inflated by pumping air through a single air valve.

Figures 9A, 9B, 9C:
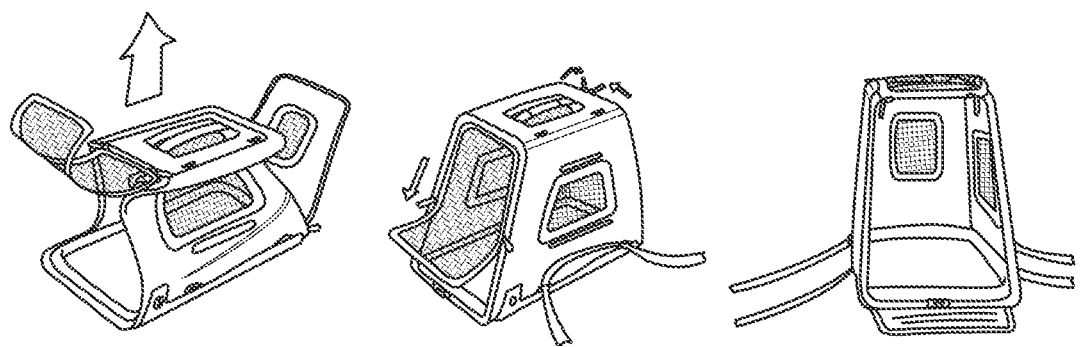
FIGS. 9A and 9B are perspective views of an inflatable animal crate moving from a deflated state to an inflated state according to certain aspects of the present disclosure.
FIG. 9C is a perspective view of the inflatable animal crate of FIGS. 9A and 9B with the front panel open.

As the first side panel 108 and the second side panel 110 are inflated, the top panel 112 moves from a first position to a second position, as may be seen in FIG. 9A. A distance between the top panel 112 and the base panel 102 in the first position is less than a distance between the top panel 112 and the base panel 102 in the second position. The connections between the base panel 102, the first side panel 108, the top panel 112, and the second side panel 110 create an open-ended, hollow trapezoidal prism when the base panel 102, the first side panel 108, the top panel 112, and the second side panel 110 are inflated. Additionally, the connections between the base panel 102, the first side panel 108, the top panel 112, and the second side panel 110 create an open-ended, hollow square prism, rectangular prism, cylindrical prism, etc.

Once in the inflated state, the rear panel 106 may be coupled to at least one of a rear end of the first side panel 108, a rear end of the top panel 112, or a rear end of the second side panel 110, as seen in FIG. 9B, using a fastener, e.g., a zipper, a hook and loop fastener, snap buttons, tie strings, magnets, straps, latches, etc. In some embodiments, the rear panel 106 is coupled to each of the rear end of the first side panel 108, the rear end of the top panel 112, and the rear end of the second side panel 110.

When positioned and coupled to the rear end of the first side panel 108, the rear end of the top panel 112 and the rear end of the second side panel 110, the rear panel 106 adds stability and structure to the inflatable animal crate 100 by locking in between the base panel 102, the first side panel 108, the top panel 112 and the second side panel 110. In some embodiments, the rear panel 106 is locked in by a friction fit between the rear panel 106 and the rear end of the base panel 102, the rear end of the first side panel 108, the rear end of the top panel 112 and the rear end of the second side panel 110. The fastener coupling the rear panel 106 to at least one of the rear end of the first side panel 108, the rear end of the top panel 112, or the rear end of the second side panel 110 may assist in preventing the rear panel 106 from being pushed or pulled from the locked in state between the base panel 102, the first side panel 108, the top panel 112 and the second side panel 110.

Similarly, once in the inflated state, the front panel 104 may be coupled to at least one of a front end of the first side panel 108, a front end of the base panel 102 or a front end of the top panel 112, and a front end of the second side panel 110, as seen in FIG. 9B, using a fastener, e.g., a zipper, a hook and loop fastener, snap buttons, tie strings, magnets, straps, latches, etc. In some embodiments, the front panel 104 is coupled to each of the front end of the first side panel 108, the front end of the top panel 112, and the front end of the second side panel 110. As seen in FIG. 9C, the front panel 104 may be decoupled from the front end of the panels while the inflatable animal crate 100 is in the inflated state to permit ingress and egress of the animal into and out of the interior compartment of the inflatable animal crate 100.

When deflating the inflatable animal crate 100, a user may decouple the rear panel 106 from first side panel 108, the top panel 112, and the second side panel 110. As the air leaves the inflatable drop stitch material, the rear panel 106 collapses on top of the base panel 102. In some embodiments, in the deflated state, the rear panel 106 abuts and rests upon the base panel 102. Further, as the air leaves the inflatable drop stitch material when deflating the inflatable animal crate 100, each of the first side panel 108 and the second side panel 110 collapse inwardly upon each respective side so that a first portion of the first side panel 108 may abut and rest upon at least one of the base panel 102 or the rear panel 106 in the deflated position and a second portion of the first side panel 108 may abut and rest upon a second portion of the first side panel 108 in the deflated position. Similarly, a first portion of the second side panel 110 may abut and rest upon at least one of the base panel 102 or the rear panel 106 in the deflated position and a second portion of the second side panel 110 may abut and rest upon a second portion of the second side panel 110 in the deflated position. Additionally, the top panel 112 may abut and rest upon at least one of the second portion of the first side panel 108 or the second portion of the second side panel 110.

In some embodiments, the materials and features of the inflatable animal crate 100, 200 are selected so that the inflatable animal crate 100, 200 meets the Pet Safety Certification Testing through the Carrier Crash Test Protocol and Rating System conducted by the Center for Pet Safety®. The safety standard CPS-001-016.01 developed by the Center for Pet Safety® is used to evaluate pet carriers and other pet accessories for their crash protection. The CPS-001-016.01 standard references the test conditions and equipment used in the Federal Motor Vehicle Safety Standard No. 213 but grades the products differently than a child's car seat. For example, the CPS-001-016.01 grades, e.g., using a point system, on the following areas: (1) having an excursion measurement of less than or equal to 32 inches; (2) carrier closure, e.g., clasps, zippers, etc., integrity; (3) carrier integrity, e.g., the integrity of the construction of the carrier; and (4) lift, which is a measurement of how high the carrier rises of the bench seat during the testing.

In the following, further examples are described to facilitate the understanding of the invention (and in some aspects, features of an apparatus or system described in one or more of these examples may be utilized in a method described in one of the other examples or vice versa). These examples are not meant to be mutually exclusive, exhaustive, or restrictive; and the disclosure is not limited to these examples but rather encompasses all possible modifications and variations within the scope of the issued claims and their equivalents.

Example 1 is an inflatable crate assembly (which may incorporate features of any of the subsequent examples) comprising: a base panel, a rear panel, a first side panel, a second side panel, and a top panel, wherein: the base panel, the rear panel, the first side panel, the second side panel, and the top panel are all formed from a single piece of drop stitch material; an inner wall of the drop stitch material forms at least a portion of an interior surface of the inflatable crate assembly; and an outer wall of the drop stitch material forms at least a portion of an exterior surface of the inflatable crate assembly; and a drop stitch corner formed between each of the rear panel and the base panel, the first side panel and the base panel, the top panel and the first side panel, and the second side panel and the top panel.

Example 2 is the inflatable crate assembly of example(s) 1 or any preceding or subsequent example(s) or combination of examples, wherein: a first corner member is coupled to the inner wall of the rear panel and the inner wall of the base panel at the drop stitch corner formed between the rear panel and the base panel; a second corner member is coupled to the inner wall of the first side panel and the inner wall of the base panel at the drop stitch corner formed between the first side panel and the base panel; a third corner member is coupled to the inner wall of the top panel and the inner wall of the first side panel at the drop stitch corner formed between the top panel and the first side panel; and a fourth corner member is coupled to the inner wall of the second side panel and the inner wall of the top panel at the drop stitch corner formed between the second side panel and the top panel.

Example 3 is the inflatable crate assembly of example(s) 2 or any preceding or subsequent example(s) or combination of examples, wherein the first corner member and the second corner member are integrally formed.

Example 4 is the inflatable crate assembly of example(s) 1 or any preceding or subsequent example(s) or combination of examples, wherein the rear panel locks in between the base panel, the first side panel, the second side panel, and the top panel.

Example 5 is the inflatable crate assembly of example(s) 1 or any preceding or subsequent example(s) or combination of examples, wherein: the inner wall of the rear panel does not contact the inner wall of the base panel; the inner wall of the first side panel does not contact the inner wall of the base panel; the inner wall of the top panel does not contact the inner wall of the first side panel; and the inner wall of the second side panel does not contact the inner wall of the top panel.

Example 6 is the inflatable crate assembly of example(s) 1 or any preceding or subsequent example(s) or combination of examples, further comprising a front panel formed from the single piece of drop stitch material and a drop stitch corner formed between either the front panel and the base panel or the front panel and the top panel.

Example 7 is the inflatable crate assembly of example(s) 1 or any preceding or subsequent example(s) or combination of examples, wherein each drop stitch corner formed between the rear panel and the base panel, the first side panel and the base panel, the top panel and the first side panel, and the second side panel and the top panel permits air to flow between the respective rear panel, base panel, first side panel, top panel, and second side panel.

Example 8 is an inflatable crate assembly (which may incorporate features of any of the preceding or subsequent examples) comprising: a base panel, a rear panel, a first side panel, a second side panel, and a top panel, wherein: the base panel, the rear panel, the first side panel, the second side panel, and the top panel are all formed from a single piece of drop stitch material; an inner wall of the drop stitch material forms at least a portion of an interior surface of the inflatable crate assembly; and an outer wall of the drop stitch material forms at least a portion of an exterior surface of the inflatable crate assembly; a drop stitch corner formed between at least one of the rear panel and the base panel, the first side panel and the base panel, the top panel and the first side panel, or the second side panel and the top panel; and a connected corner formed between at least one of the rear panel and the base panel, the first side panel and the base panel, the top panel and the first side panel, the second side panel and the top panel, or the base panel and the second side panel, wherein a first connecting member is coupled to the inner wall of the respective panels on each side of the connected corner, and a second connecting member is coupled to the outer wall of the respective panels on each side of the connected corner.

Example 9 is the inflatable crate assembly of example(s) 8 or any preceding or subsequent example(s) or combination of examples, wherein: a first corner member is coupled to the inner wall of the rear panel and the inner wall of the base panel at the drop stitch corner formed between the rear panel and the base panel; a second corner member is coupled to the inner wall of the first side panel and the inner wall of the base panel at the drop stitch corner formed between the first side panel and the base panel; a third corner member is coupled to the inner wall of the top panel and the inner wall of the first side panel at the drop stitch corner formed between the top panel and the first side panel; a fourth corner member is coupled to the inner wall of the second side panel and the inner wall of the top panel at the drop stitch corner formed between the second side panel and the top panel; and the first connecting member is coupled to the inner wall of the base panel and the inner wall of the second side panel and the second connecting member is coupled to the outer wall of the base panel and the inner wall of the second side panel at the connected corner.

Example 10 is the inflatable crate assembly of example(s) 9 or any preceding or subsequent example(s) or combination of examples, wherein the first corner member and the second corner member are integrally formed.

Example 11 is the inflatable crate assembly of example(s) 8 or any preceding or subsequent example(s) or combination of examples, wherein the rear panel locks in between the base panel, the first side panel, the second side panel, and the top panel.

Example 12 is the inflatable crate assembly of example(s) 8 or any preceding or subsequent example(s) or combination of examples, wherein: the inner wall of the rear panel does not contact the inner wall of the base panel; the inner wall of the first side panel does not contact the inner wall of the base panel; the inner wall of the top panel does not contact the inner wall of the first side panel; the inner wall of the second side panel does not contact the inner wall of the top panel; and the inner wall of the base panel does not contact the inner wall of the second side panel.

Example 13 is the inflatable crate assembly of example(s) 8 or any preceding or subsequent example(s) or combination of examples, further comprising a front panel formed from the single piece of drop stitch material and a drop stitch corner formed between either the front panel and the base panel or the front panel and the top panel.

Example 14 is the inflatable crate assembly of example(s) 8 or any preceding or subsequent example(s) or combination of examples, wherein each drop stitch corner formed between at least one of the rear panel and the base panel, the first side panel and the base panel, the top panel and the first side panel, and the second side panel and the top panel permits air to flow between the respective rear panel, base panel, first side panel, top panel, and second side panel.

Example 15 is the inflatable crate assembly of example(s) 8 or any preceding or subsequent example(s) or combination of examples, wherein each connected corner formed between at least one of the rear panel and the base panel, the first side panel and the base panel, the top panel and the first side panel, the second side panel and the top panel, or the base panel and the second side panel does not permit air to flow between the respective rear panel, base panel, first side panel, top panel, and second side panel.

Example 16 is a method (which may incorporate features of any of the preceding or subsequent examples) for deploying and stowing an inflatable crate assembly comprising a base panel, a rear panel, a first side panel, a second side panel, a top panel, and a front panel and an air intake valve, wherein at least the base panel, the rear panel, the first side panel, the second side panel, and the top panel are all formed from a single piece of drop stitch material, the method comprising: inflating each of the base panel, the rear panel, the first side panel, the second side panel, and the top panel via the air intake valve; fastening the rear panel to a rear end of each of the first side pane, the top panel, and the second side panel to lock the rear panel between the base panel, the first side panel, the second side panel, and the top panel; and fastening the front panel to a front end of each of the first side pane, the top panel, and the second side panel.

Example 17 is the method of example(s) 16 or any preceding or subsequent example(s) or combination of examples, wherein: a first corner member is coupled to an inner wall of the drop stitch material of the rear panel and an inner wall of the drop stitch material of the base panel at a drop stitch corner formed between the rear panel and the base panel; a second corner member is coupled to an inner wall of the drop stitch material of the first side panel and the inner wall of the drop stitch material of the base panel at a drop stitch corner formed between the first side panel and the base panel; a third corner member is coupled to an inner wall of the drop stitch material of the top panel and the inner wall of the drop stitch material of the first side panel at a drop stitch corner formed between the top panel and the first side panel; and a fourth corner member is coupled to an inner wall of the drop stitch material of the second side panel and the inner wall of the drop stitch material of the top panel at a drop stitch corner formed between the second side panel and the top panel.

Example 18 is the method of example(s) 17 or any preceding or subsequent example(s) or combination of examples, wherein: the inner wall of the drop stitch material of the rear panel does not contact the inner wall of the drop stitch material of the base panel; the inner wall of the drop stitch material of the first side panel does not contact the inner wall of the drop stitch material of the base panel; the inner wall of the drop stitch material of the top panel does not contact the inner wall of the drop stitch material of the first side panel; and the inner wall of the drop stitch material of the second side panel does not contact the inner wall of the drop stitch material of the top panel.

Example 19 is the method of example(s) 16 or any preceding or subsequent example(s) or combination of examples, wherein the inflated base panel, rear panel, first side panel, second side panel and top panel form an open-ended, hollow trapezoidal prism.

Example 20 is the method of example(s) 16 or any preceding example(s) or combination of examples, wherein the front panel is formed from the single piece of drop stitch material and a drop stitch corner is formed between either the front panel and the base panel or the front panel and the top panel.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An inflatable crate assembly comprising:
a base panel, a rear panel, a first side panel, a second side panel, and a top panel, wherein:
the base panel, the rear panel, the first side panel, the second side panel, and the top panel are all formed from a single piece of drop stitch material;
an inner wall of the drop stitch material forms at least a portion of an interior surface of the inflatable crate assembly; and
an outer wall of the drop stitch material forms at least a portion of an exterior surface of the inflatable crate assembly; and
a drop stitch corner formed between each of the rear panel and the base panel, the first side panel and the base panel, the top panel and the first side panel, and the second side panel and the top panel; and
an air valve arranged on one of the base panel, the rear panel, the first side panel, the second side panel, or the top panel.

2. The inflatable crate assembly of claim 1, wherein:
a first corner member is coupled to the inner wall of the rear panel and the inner wall of the base panel at the drop stitch corner formed between the rear panel and the base panel;
a second corner member is coupled to the inner wall of the first side panel and the inner wall of the base panel at the drop stitch corner formed between the first side panel and the base panel;
a third corner member is coupled to the inner wall of the top panel and the inner wall of the first side panel at the drop stitch corner formed between the top panel and the first side panel; and
a fourth corner member is coupled to the inner wall of the second side panel and the inner wall of the top panel at the drop stitch corner formed between the second side panel and the top panel.

3. The inflatable crate assembly of claim 2, wherein the first corner member and the second corner member are integrally formed.

4. The inflatable crate assembly of claim 1, wherein the rear panel locks in by a friction fit between the base panel, the first side panel, the second side panel, and the top panel.

5. The inflatable crate assembly of claim 1, wherein:
the inner wall of the rear panel joins the inner wall of the base panel along a first fold line extending longitudinally through the drop stitch corner formed between the rear panel and the base panel, and the inner wall of the rear panel immediately adjacent the first fold line does not contact the inner wall of the base panel immediately adjacent the first fold line;
the inner wall of the first side panel joins the inner wall of the base panel along a second fold line extending longitudinally through the drop stitch corner formed between the first side panel and the base panel, and the inner wall of the first side panel immediately adjacent the second fold line does not contact the inner wall of the base panel immediately adjacent the second fold line;
the inner wall of the top panel joins the inner wall of the first side panel along a third fold line extending longitudinally through the drop stitch corner formed between the top panel and the first side panel, and the inner wall of the top panel immediately adjacent the third fold line does not contact the inner wall of the first side panel immediately adjacent the third fold line; and
the inner wall of the second side panel joins the inner wall of the top panel along a fourth fold line extending longitudinally through the drop stitch corner formed between the second side panel and the top panel, and the inner wall of the second side panel immediately adjacent the fourth fold line does not contact the inner wall of the top panel immediately adjacent the fourth fold line.

6. The inflatable crate assembly of claim 1, further comprising a front panel formed from the single piece of drop stitch material and a drop stitch corner formed between either the front panel and the base panel or the front panel and the top panel.

7. The inflatable crate assembly of claim 1, wherein each drop stitch corner formed between the rear panel and the base panel, the first side panel and the base panel, the top panel and the first side panel, and the second side panel and the top panel permits air to flow between the respective rear panel, base panel, first side panel, top panel, and second side panel.

8. An inflatable crate assembly comprising:
a base panel, a rear panel, a first side panel, a second side panel, and a top panel, wherein:
the base panel, the rear panel, the first side panel, the second side panel, and the top panel are all formed from a single piece of drop stitch material;
an inner wall of the drop stitch material forms at least a portion of an interior surface of the inflatable crate assembly; and
an outer wall of the drop stitch material forms at least a portion of an exterior surface of the inflatable crate assembly;
a drop stitch corner formed between at least one of the rear panel and the base panel, the first side panel and the base panel, the top panel and the first side panel, or the second side panel and the top panel;
a connected corner formed between at least one of the rear panel and the base panel, the first side panel and the base panel, the top panel and the first side panel, the second side panel and the top panel, or the base panel and the second side panel, wherein a first connecting member is coupled to the inner wall of the respective panels on each side of the connected corner, and a second connecting member is coupled to the outer wall of the respective panels on each side of the connected corner; and
an air valve arranged on one of the base panel, the rear panel, the first side panel, the second side panel, or the top panel.

9. The inflatable crate assembly of claim 8, wherein:
a first corner member is coupled to the inner wall of the rear panel and the inner wall of the base panel at the drop stitch corner formed between the rear panel and the base panel;
a second corner member is coupled to the inner wall of the first side panel and the inner wall of the base panel at the drop stitch corner formed between the first side panel and the base panel;
a third corner member is coupled to the inner wall of the top panel and the inner wall of the first side panel at the drop stitch corner formed between the top panel and the first side panel;
a fourth corner member is coupled to the inner wall of the second side panel and the inner wall of the top panel at the drop stitch corner formed between the second side panel and the top panel; and
the first connecting member is coupled to the inner wall of the base panel and the inner wall of the second side panel and the second connecting member is coupled to the outer wall of the base panel and the inner wall of the second side panel at the connected corner.

10. The inflatable crate assembly of claim 9, wherein the first corner member and the second corner member are integrally formed.

11. The inflatable crate assembly of claim 8, wherein the rear panel locks in by a friction fit between the base panel, the first side panel, the second side panel, and the top panel.

12. The inflatable crate assembly of claim 8, wherein:
the inner wall of the rear panel joins the inner wall of the base panel along a first fold line extending longitudinally through the drop stitch corner formed between the rear panel and the base panel, and the inner wall of the rear panel immediately adjacent the first fold line does not contact the inner wall of the base panel immediately adjacent the first fold line;
the inner wall of the first side panel joins the inner wall of the base panel along a second fold line extending longitudinally through the drop stitch corner formed between the first side panel and the base panel, and the inner wall of the first side panel immediately adjacent the second fold line does not contact the inner wall of the base panel immediately adjacent the second fold line;
the inner wall of the top panel joins the inner wall of the first side panel along a third fold line extending longitudinally through the drop stitch corner formed between the top panel and the first side panel, and the inner wall of the top panel immediately adjacent the third fold line does not contact the inner wall of the first side panel immediately adjacent the third fold line; and
the inner wall of the second side panel joins the inner wall of the top panel along a fourth fold line extending longitudinally through the drop stitch corner formed between the second side panel and the top panel, and the inner wall of the second side panel immediately adjacent the fourth fold line does not contact the inner wall of the top panel immediately adjacent the fourth fold line.

13. The inflatable crate assembly of claim 8, further comprising a front panel formed from the single piece of drop stitch material and a drop stitch corner formed between either the front panel and the base panel or the front panel and the top panel.

14. The inflatable crate assembly of claim 8, wherein each drop stitch corner formed between at least one of the rear panel and the base panel, the first side panel and the base panel, the top panel and the first side panel, and the second side panel and the top panel permits air to flow between the respective rear panel, base panel, first side panel, top panel, and second side panel.

15. The inflatable crate assembly of claim 8, wherein each connected corner formed between at least one of the rear panel and the base panel, the first side panel and the base panel, the top panel and the first side panel, the second side panel and the top panel, or the base panel and the second side panel does not permit air to flow between the respective rear panel, base panel, first side panel, top panel, and second side panel.

16. A method for deploying and stowing an inflatable crate assembly comprising a base panel, a rear panel, a first side panel, a second side panel, a top panel, and a front panel and an air intake valve, wherein at least the base panel, the rear panel, the first side panel, the second side panel, and the top panel are all formed from a single piece of drop stitch material, the method comprising:
inflating each of the base panel, the rear panel, the first side panel, the second side panel, and the top panel via the air intake valve;
fastening the rear panel to a rear end of each of the first side panel, the top panel, and the second side panel to lock the rear panel between the base panel, the first side panel, the second side panel, and the top panel; and
fastening the front panel to a front end of each of the first side panel, the top panel, and the second side panel.

17. The method of claim 16, wherein:
a first corner member is coupled to an inner wall of the drop stitch material of the rear panel and an inner wall of the drop stitch material of the base panel at a drop stitch corner formed between the rear panel and the base panel;
a second corner member is coupled to an inner wall of the drop stitch material of the first side panel and the inner wall of the drop stitch material of the base panel at a drop stitch corner formed between the first side panel and the base panel;
a third corner member is coupled to an inner wall of the drop stitch material of the top panel and the inner wall of the drop stitch material of the first side panel at a drop stitch corner formed between the top panel and the first side panel; and
a fourth corner member is coupled to an inner wall of the drop stitch material of the second side panel and the inner wall of the drop stitch material of the top panel at a drop stitch corner formed between the second side panel and the top panel.

18. The method of claim 17, wherein:
the inner wall of the drop stitch material of the rear panel joins the inner wall of the drop stitch material of the base panel along a first fold line extending longitudinally through the drop stitch corner formed between the rear panel and the base panel, and the inner wall of the drop stitch material of the rear panel immediately adjacent the first fold line does not contact the inner wall of the drop stitch material of the base panel immediately adjacent the first fold line;
the inner wall of the drop stitch material of the first side panel joins the inner wall of the drop stitch material of the base panel along a second fold line extending longitudinally through the drop stitch corner formed between the first side panel and the base panel, and the inner wall of the drop stitch material of the first side panel immediately adjacent the second fold line does not contact the inner wall of the drop stitch material of the base panel immediately adjacent the second fold line;
the inner wall of the drop stitch material of the top panel joins the inner wall of the drop stitch material of the first side panel along a third fold line extending longitudinally through the drop stitch corner formed between the top panel and the first side panel, and the inner wall of the drop stitch material of the top panel immediately adjacent the third fold line does not contact the inner wall of the drop stitch material of the first side panel immediately adjacent the third fold line; and
the inner wall of the drop stitch material of the second side panel joins the inner wall of the drop stitch material of the top panel along a fourth fold line extending longitudinally through the drop stitch corner formed between the second side panel and the top panel, and the inner wall of the drop stitch material of the second side panel immediately adjacent the fourth fold line does not contact the inner wall of the drop stitch material of the top panel immediately adjacent the fourth fold line.

19. The method of claim 16, wherein the inflated base panel, rear panel, first side panel, second side panel and top panel form an open-ended, hollow trapezoidal prism.

20. The method of claim 16, wherein the front panel is formed from the single piece of drop stitch material and a drop stitch corner is formed between either the front panel and the base panel or the front panel and the top panel.

* * * * *